United States Patent
Zhang et al.

(10) Patent No.: US 11,026,218 B2
(45) Date of Patent: Jun. 1, 2021

(54) INDICATION ON JOINT MULTI-TRANSMISSION POINT TRANSMISSION IN NEW RADIO SYSTEM

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/381,976

(22) Filed: Apr. 11, 2019

(65) Prior Publication Data

US 2019/0320420 A1 Oct. 17, 2019

Related U.S. Application Data

(60) Provisional application No. 62/658,380, filed on Apr. 16, 2018.

(51) Int. Cl.
*H04W 72/04* (2009.01)
*H04L 29/08* (2006.01)
*H04W 88/02* (2009.01)

(52) U.S. Cl.
CPC ......... *H04W 72/042* (2013.01); *H04L 69/324* (2013.01); *H04W 88/02* (2013.01)

(58) Field of Classification Search
CPC .. H04W 72/042; H04W 88/02; H04L 69/324; H04L 45/24; H04L 69/14; H04L 63/18;
(Continued)

(56) References Cited

U.S. PATENT DOCUMENTS

2010/0238823 A1* 9/2010 Chen ................. H04W 72/1289
370/252
2011/0223924 A1* 9/2011 Lohr ................. H04W 72/1289
455/450
(Continued)

FOREIGN PATENT DOCUMENTS

WO 2017217740 A1 12/2017
WO 2017222257 A1 12/2017

OTHER PUBLICATIONS

International Search Report and Written Opinion—PCT/US2019/027282—ISA/EPO—dated Jul. 22, 2019.

*Primary Examiner* — Kwang B Yao
*Assistant Examiner* — Syed M Bokhari
(74) *Attorney, Agent, or Firm* — Loza & Loza, LLP

(57) ABSTRACT

Aspects of the disclosure relate to a method and apparatus for receiving a joint transport block transmission. A user equipment (UE) receives a configuration message configuring the UE to receive a joint transport block (TB) transmission of data from a plurality of transmission points (TRPs). The UE determines a transport block size (TBS) for receiving the joint TB transmission, receives transport blocks corresponding to the joint TB transmission, each transport block from a respective one of the plurality of TRPs, combines the transport blocks when a size of each of the transport blocks is the determined TBS, and recovers the data based on the combined transport blocks. Other aspects, embodiments, and features are also claimed and described.

14 Claims, 11 Drawing Sheets

(58) Field of Classification Search
CPC . H04L 5/003; H04L 5/001; H04L 1/00; H04L 5/0094; H04B 7/024
USPC .................. 370/329, 252, 281, 294, 262
See application file for complete search history.

(56) References Cited

U.S. PATENT DOCUMENTS

| | | |
|---|---|---|
| 2013/0201816 A1 | 8/2013 | Zhang et al. |
| 2013/0308504 A1* | 11/2013 | Nimbalker .............. H04L 5/003 370/281 |
| 2014/0269460 A1* | 9/2014 | Papasakellariou .... H04L 5/0053 370/294 |
| 2015/0271006 A1* | 9/2015 | Han ...................... H04L 1/0061 370/329 |
| 2018/0048498 A1* | 2/2018 | Stern-Berkowitz .......................... H04W 16/14 |
| 2018/0097673 A1* | 4/2018 | Nangia ............... H04L 27/2613 |
| 2019/0149197 A1* | 5/2019 | Byun ................... H04B 7/0628 375/262 |

* cited by examiner

INDICATION ON JOINT MULTI-TRANSMISSION POINT TRANSMISSION IN NEW RADIO SYSTEM

PRIORITY CLAIM

This application claims priority to and the benefit of U.S. Provisional Patent Application No. 62/658,380 filed on Apr. 16, 2018, the entire content of which is incorporated herein by reference as if fully set forth below in its entirety and for all applicable purposes.

TECHNICAL FIELD

The technology discussed below relates generally to wireless communication systems, and more particularly, to a joint transport block (TB) transmission scheme across multiple transmission points (TRPs).

INTRODUCTION $3^{rd}$ Generation Partnership Project (3GPP) New Radio (NR) specifications (often referred to as 5G) support downlink transmissions from multiple transmission points (TRPs). In a multi-TRP transmission scheme, multiple TRPs may or may not be co-located (e.g., within a same cell). Moreover, the multiple TRPs may transmit data to the same UE. The data sent from the multiple TRPs to the same UE may be the same data or different data. When transmitting different data from the multiple TRPs, a higher throughput may be achieved. When transmitting the same data (with potentially different redundancy versions) from the multiple TRPs, transmission reliability may be improved.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a method and apparatus for receiving a joint transport block transmission. A user equipment (UE) receives a configuration message configuring the UE to receive a joint transport block (TB) transmission of data from a plurality of transmission points (TRPs). The UE determines a transport block size (TBS) for receiving the joint transport block (TB) transmission, receives transport blocks corresponding to the joint TB transmission, each transport block from a respective one of the plurality of TRPs, combines the transport blocks when a size of each of the transport blocks is the determined TBS, and recovers the data based on the combined transport blocks. Other aspects, embodiments, and features are also claimed and described.

In one example, a method operable at user equipment (UE) for receiving a joint transport block transmission is disclosed. The method includes determining a transport block size (TBS) for receiving a joint transport block (TB) transmission of data from a plurality of transmission points (TRPs), receiving transport blocks corresponding to the joint TB transmission, each transport block from a respective one of the plurality of TRPs, combining the transport blocks when a size of each of the transport blocks is the determined TBS, and recovering the data based on the combined transport blocks. The method further includes receiving a configuration message configuring the UE to receive the joint TB transmission.

In another example, a user equipment (UE) for receiving a joint transport block transmission is disclosed. The UE includes means for determining a transport block size (TBS) for receiving a joint transport block (TB) transmission of data from a plurality of transmission points (TRPs), means for receiving transport blocks corresponding to the joint TB transmission, each transport block from a respective one of the plurality of TRPs, means for combining the transport blocks when a size of each of the transport blocks is the determined TBS, and means for recovering the data based on the combined transport blocks. The UE further includes means for receiving a configuration message configuring the UE to receive the joint TB transmission.

In a further example, a user equipment (UE) for receiving a joint transport block transmission is disclosed. The UE includes at least one processor, a transceiver communicatively coupled to the at least one processor, and a memory communicatively coupled to the at least one processor. The at least one processor is configured to determine a transport block size (TBS) for receiving a joint transport block (TB) transmission of data from a plurality of transmission points (TRPs), receive transport blocks corresponding to the joint TB transmission, each transport block from a respective one of the plurality of TRPs, combine the transport blocks when a size of each of the transport blocks is the determined TBS, and recover the data based on the combined transport blocks. The at least one processor is further configured to receive a configuration message configuring the UE to receive the joint TB transmission.

In another example, a computer-readable medium storing computer-executable code for receiving a joint transport block transmission at user equipment (UE) is disclosed. The computer-readable medium includes code for causing a computer to determine a transport block size (TBS) for receiving a joint transport block (TB) transmission of data from a plurality of transmission points (TRPs), receive transport blocks corresponding to the joint TB transmission, each transport block from a respective one of the plurality of TRPs, combine the transport blocks when a size of each transport block is the determined TBS, and recover the data based on the combined transport blocks. The computer-readable medium further includes code for causing the computer to receive a configuration message configuring the UE to receive the joint TB transmission.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
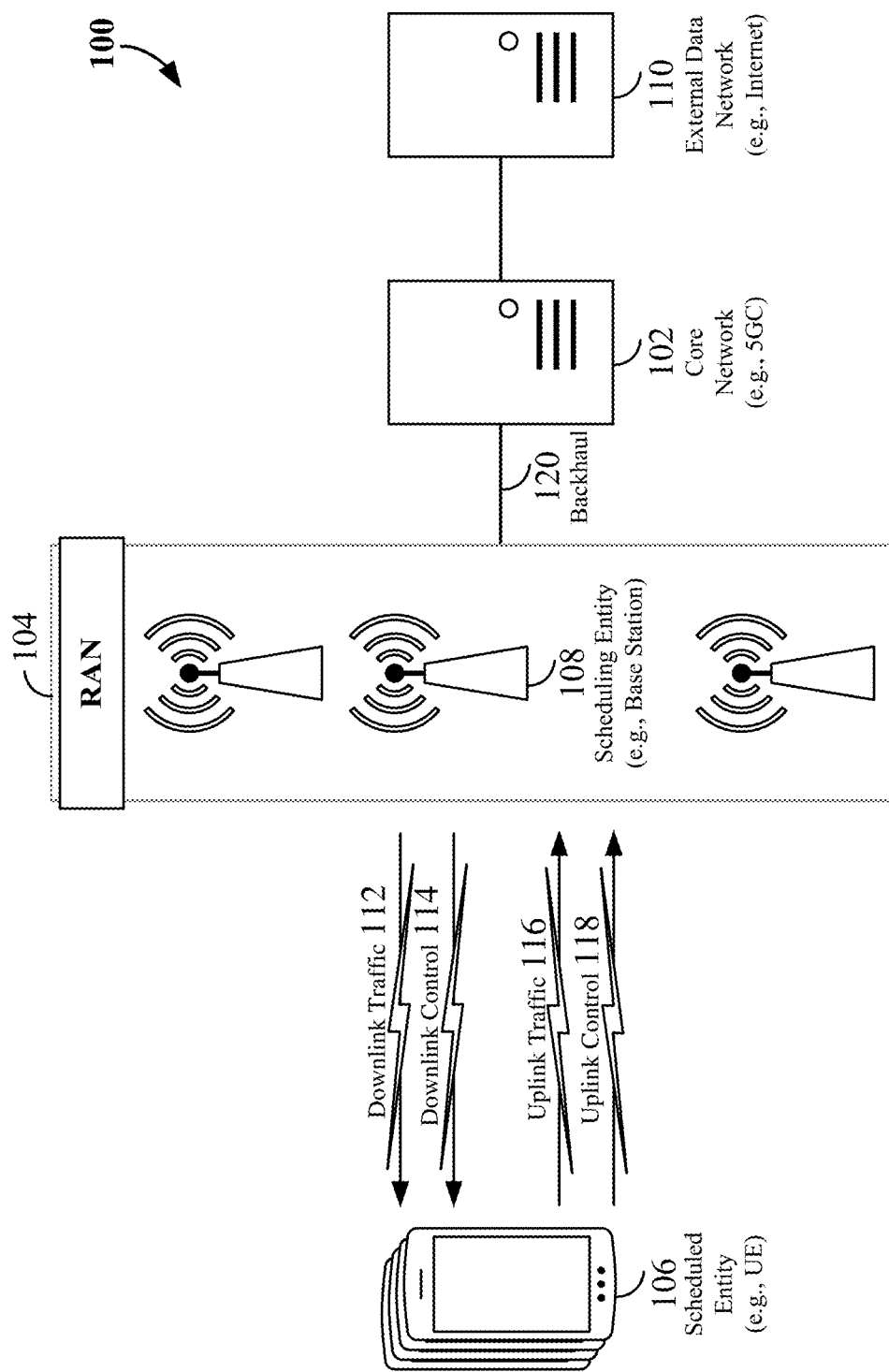
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the disclosure are directed to a scheme for transmitting a joint transport block across multiple transmission points in order to improve transmission diversity. In an example implementation, a user equipment (UE) may receive a configuration message configuring the UE to receive a joint transport block (TB) transmission of data from a plurality of transmission points (TRPs), determine a transport block size (TBS) for receiving the joint TB transmission, receive transport blocks corresponding to the joint TB transmission, each transport block from a respective one of the plurality of TRPs, combine the transport blocks when a size of each of the transport blocks is the determined TBS, and recover the data based on the combined transport blocks.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
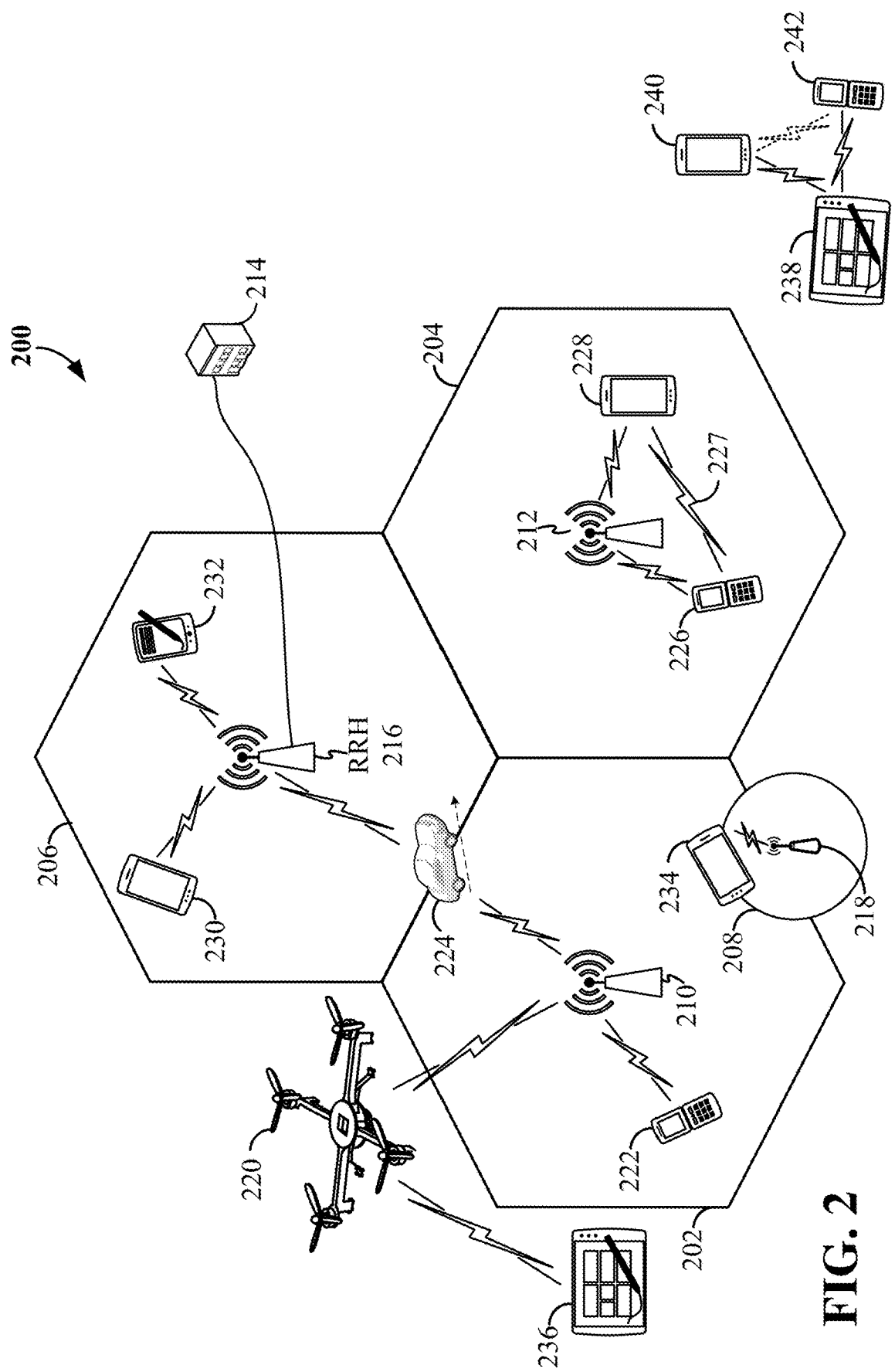
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
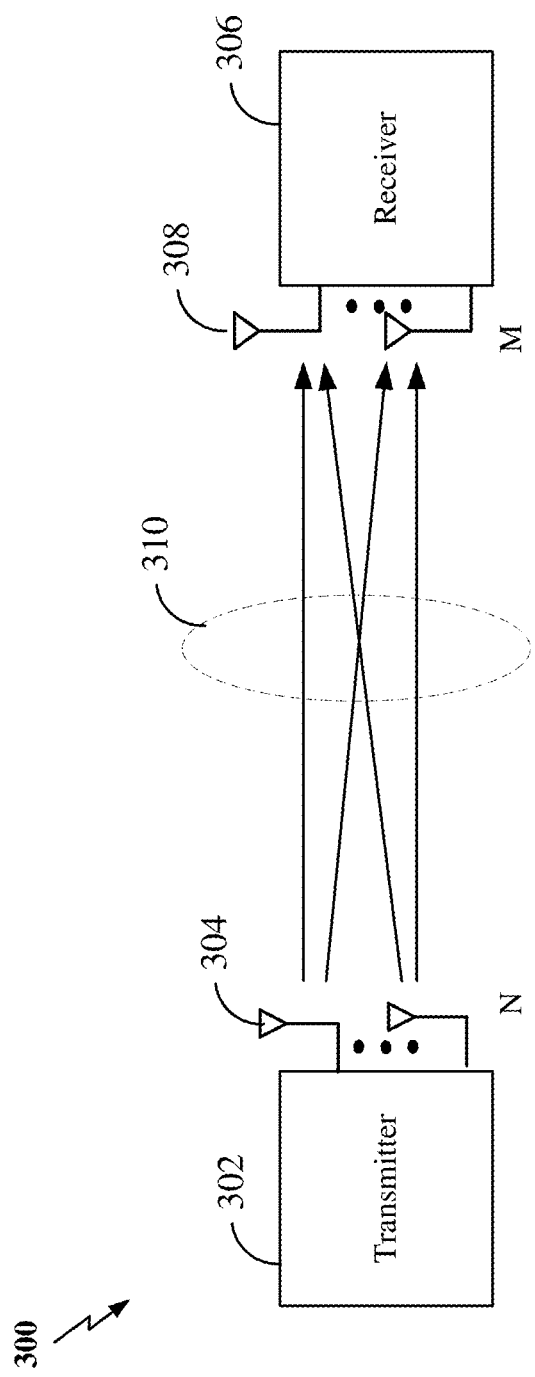
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
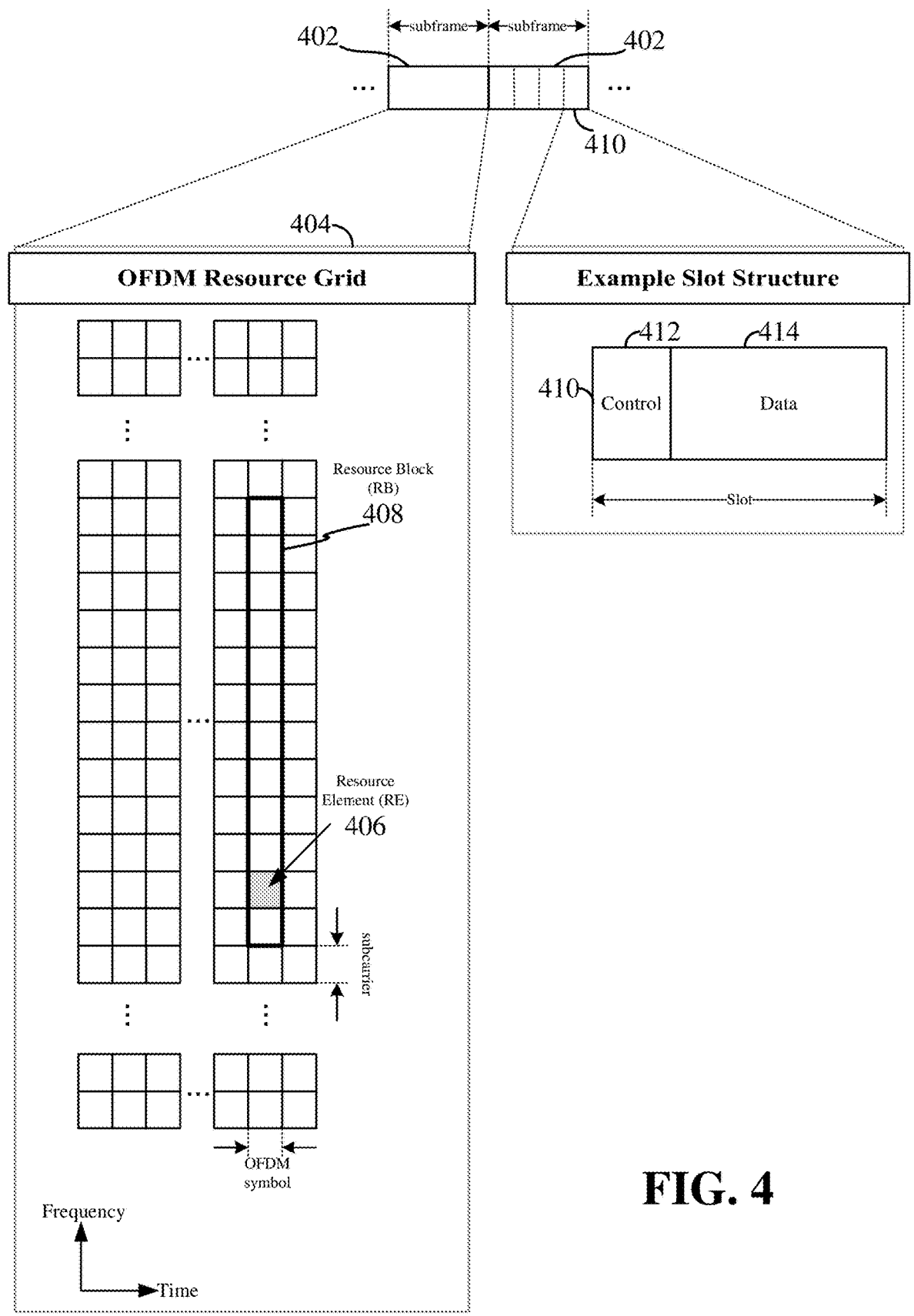
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 406 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
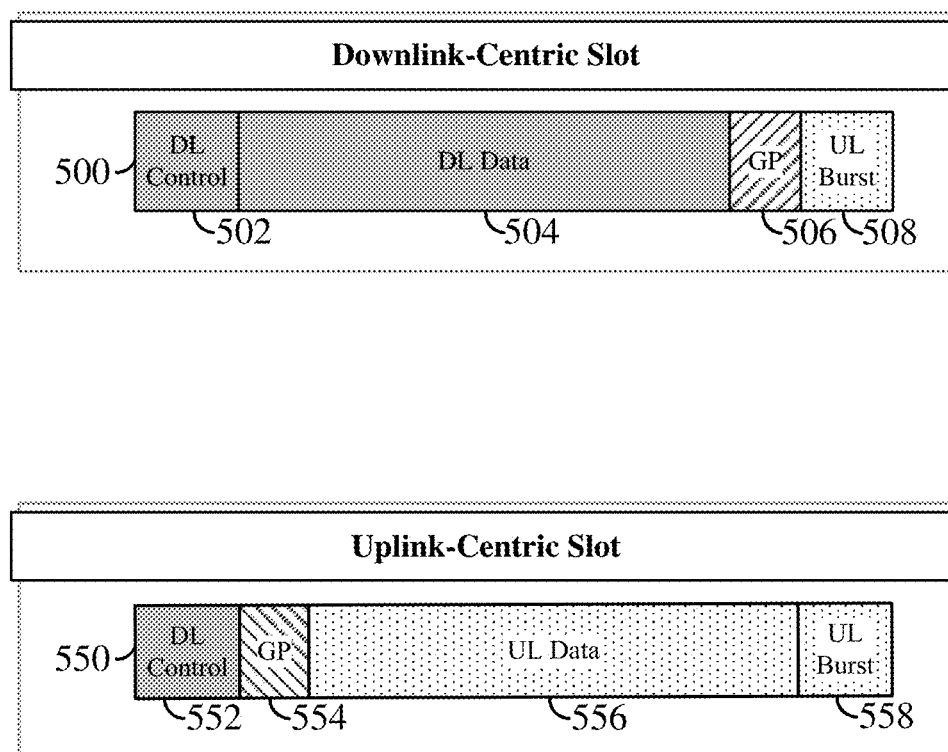
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 550 may be a receiver-scheduled slot, wherein more resources are allocated for transmissions in the UL direction (e.g., transmissions from the scheduled entity 106 to the scheduling entity 108).

Each slot, such as the self-contained slots 500 and 550, may include transmit (Tx) and receive (Rx) portions. For example, in the DL-centric slot 500, the scheduling entity 202 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration, the scheduling entity 108 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 506 may allow an amount of time after the DL data region 504 to prevent interference, where the GP region 506 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 6:
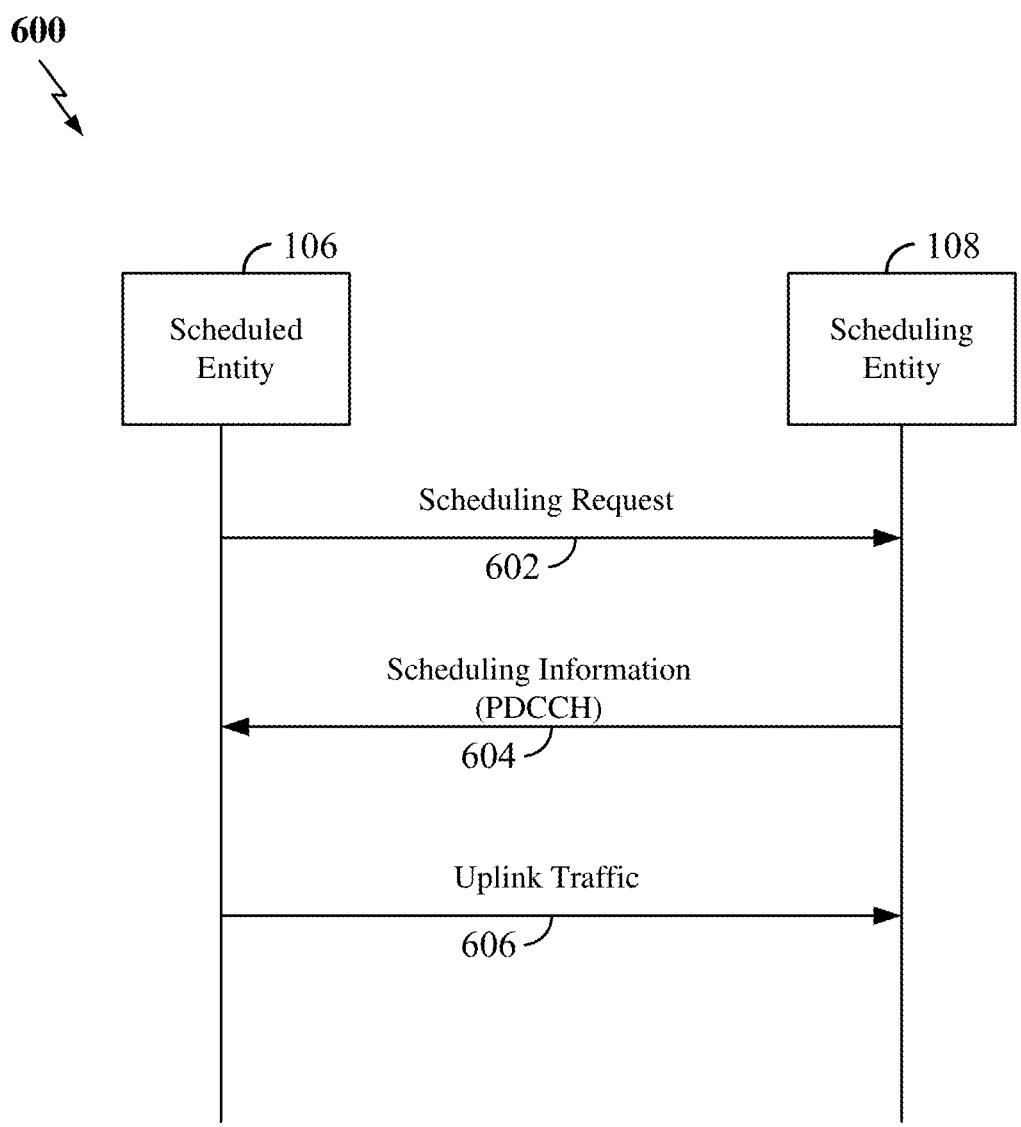
FIG. 6 is a signaling diagram illustrating exemplary signaling for dynamic scheduling according to some aspects of the present disclosure.

FIG. 6 is a signaling diagram 600 illustrating exemplary signaling for dynamic scheduling according to some aspects of the present disclosure. When user data traffic arrives in an uplink buffer of a scheduled entity 106, at 602, the scheduled entity 106 may transmit a scheduling request to the scheduling entity 108 to request an uplink grant of time-frequency resources (e.g., resource elements/resource blocks) for the scheduled entity 106 to transmit the user data traffic to the scheduling entity 108. The scheduling request may be transmitted, for example, via the PUCCH within an UL burst of a DL-centric slot or an UL-centric slot.

In response to the scheduling request, the scheduling entity 108 may allocate a set of one or more resource elements (e.g. which may correspond to one or more resource blocks) to the scheduled entity 106, and at 604, transmit scheduling information corresponding to the uplink grant (e.g., information indicative of the assigned resource elements) to the scheduled entity 106. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. At 606, the scheduled entity 106 may then utilize the assigned uplink resource element(s) to transmit the user data traffic to the scheduling entity 108. The assigned uplink resources for the traffic may be within the same slot as the PDCCH (e.g., when the PDCCH is transmitted in an UL-centric slot) or within a subsequent slot (e.g., when the PDCCH is transmitted in a DL-centric slot).

Figure 7:
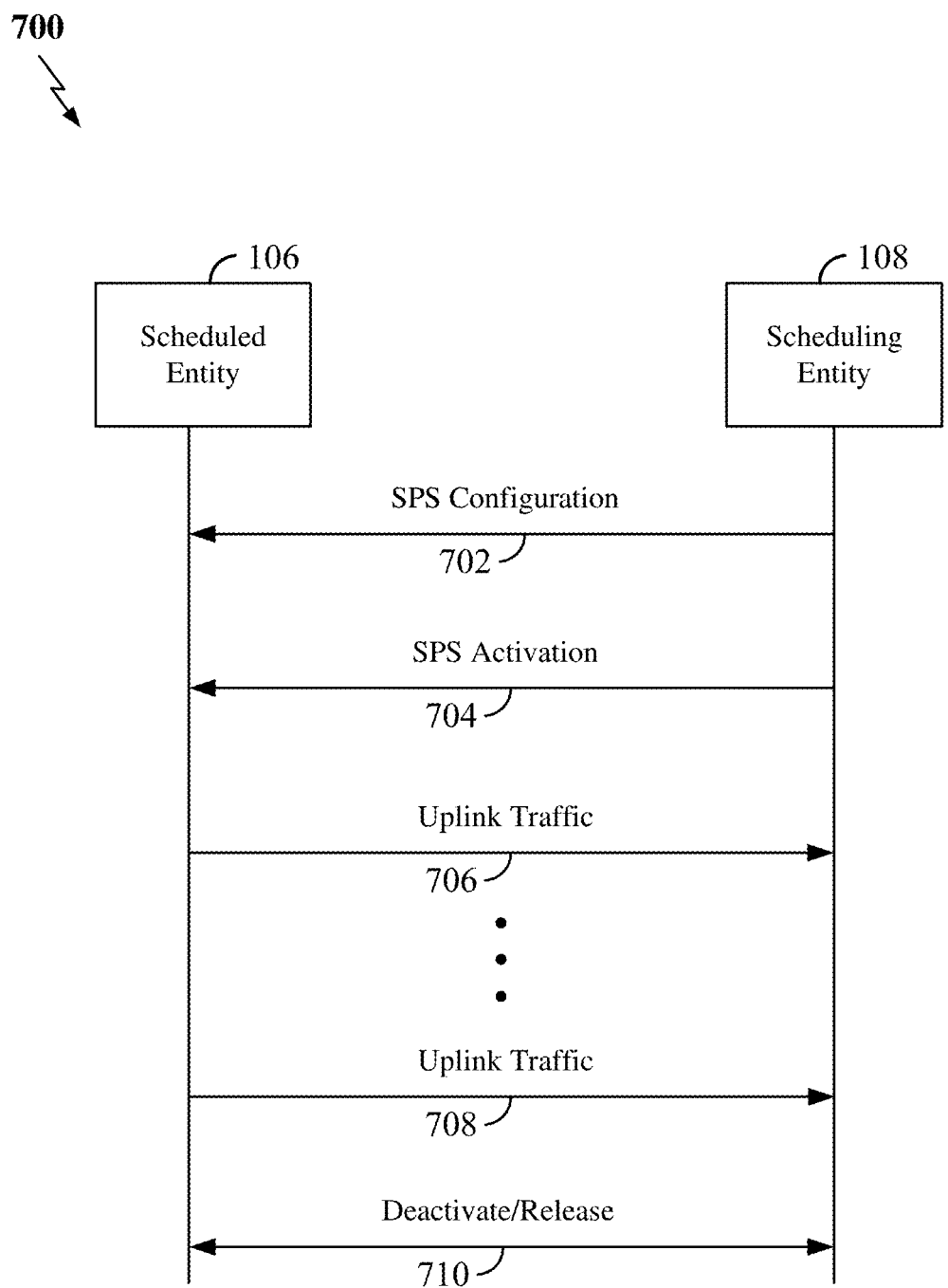
FIG. 7 is a signaling diagram illustrating exemplary signaling for semi-persistent scheduling (SPS) according to some aspects of the present disclosure.

FIG. 7 is a signaling diagram 700 illustrating exemplary signaling for semi-persistent scheduling (SPS) according to some aspects of the present disclosure. Generally, SPS may be used for periodic communications based on defined settings. For example, SPS may be suitable for applications with small, predictable, and/or periodic payloads, such as voice over Internet protocol (VoIP) applications. To avoid overwhelming the PDCCH, scheduling information corresponding to an uplink grant may be signaled just once on the PDCCH. Subsequently, without needing to receive additional scheduling information, the scheduled entity 106 may periodically utilize the resources allocated in the uplink grant. The periodicity with which the scheduled entity 106 may transmit user data traffic via the semi-persistently scheduled resources may be established when the SPS uplink grant is initially configured.

With reference to the diagram illustrated in FIG. 7, at 702, the scheduling entity 108 may configure SPS for a scheduled entity 106 and transmit scheduling information containing SPS configuration parameters to the scheduled entity 106. The SPS configuration message including the scheduling information may be transmitted, for example, via a PDCCH within a DL-burst of a DL-centric slot or an UL-centric slot. The SPS configuration parameters may include, for example, an indication of the allocated resources for the SPS uplink grant, a semi-persistent scheduling identifier (e.g., an SPS-RNTI) for the scheduled entity 106 and a periodicity of the SPS uplink grant. The SPS-RNTI may be assigned by the scheduling entity 108 and utilized to scramble subsequent transmissions related to the SPS uplink grant. Additional SPS configuration parameters may also include, but are not limited to, an implicit release time, cyclic shift DMRS configuration, modulation and coding scheme (MCS) and/or other parameters. The SPS uplink grant may be configured, for example, via a radio resource control (RRC) protocol.

The scheduling entity may configure the SPS grant at any time based on the service requirements of the scheduled entity 106 or in response to a request by the scheduled entity 106. For example, the scheduling entity 108 may configure the SPS grant based on the Quality of Service (QoS) to be provided to the scheduled entity and/or a type of traffic to be sent by the scheduling entity. In some examples, the scheduling entity 108 may configure the SPS uplink grant upon dedicated bearer establishment for a VoIP service. As another example, the scheduling entity 108 may configure the SPS uplink grant to meet a low-latency QoS requirement for one or more uplink packets.

Once configured, in order to begin using the SPS uplink grant, at 704, the scheduling entity 108 may then transmit an SPS activation message scrambled with the SPS-RNTI to the scheduled entity 106 to activate the SPS uplink grant and enable the scheduled entity 106 to utilize the SPS uplink grant based on the SPS configuration parameters. The SPS activation message may be transmitted, for example, via the PDCCH within a DL burst of a DL-centric slot or an UL-centric slot. At 706 and 708, the scheduled entity 106 may then utilize the assigned uplink resources to periodically transmit uplink traffic to the scheduling entity within an UL-centric slot based on the periodicity of the SPS uplink grant. During periods of silence or when a data transfer is complete, at 710, the SPS uplink grant may be deactivated/released. For example, an explicit deactivation/release message may be transmitted from the scheduling entity 108 to the scheduled entity 106. In other examples, the scheduled entity 106 may initiate an inactivity timer with the implicit release time received as part of the SPS configuration parameters, and when the inactivity timer expires, the scheduled entity 106 may release the SPS uplink resources.

While the SPS uplink grant is activated, the allocated uplink resources, MCS and other SPS configuration parameters remain fixed. However, retransmissions (e.g., HARQ retransmissions) may be dynamically scheduled between SPS intervals using the SPS-RNTI. In addition, if the radio link conditions change, a new SPS uplink grant may need to be configured and activated.

As indicated above, PUCCH resources may be allocated both semi-statically, as shown in FIG. 7, and dynamically, as shown in FIG. 6. By providing flexibility in UCI resource allocation in 5G NR wireless networks, UCI resource grants to a particular UE for periodic UCI (e.g., semi-static UCI resource grants) may occur near in time or overlap in time with UCI resource grants to that particular UE for aperiodic UCI (e.g., dynamic UCI resource grants). Similarly, dynamic UCI resource grants to a UE may occur near in time or overlap in time with other dynamic UCI resource grants for that UE, and semi-static UCE resource grants to a UE may also occur near in time or overlap in time with other semi-static UCI resource grants for that UE. For example, multiple semi-static UCI resource grants may be allocated to a UE, each configured for different UCI (e.g., one grant for periodic or SPS feedback information, one grant for scheduling requests, and one grant for periodic CQI). The semi-static UCI resource grants may have different periodicities, different starting offsets or different transmission patterns in time.

5G NR multi-transmission point (TRP) transmission in the downlink (DL) may support two modes. In a first mode, a single downlink control information (DCI) transmission grants a single transport block (TB) to a device (e.g., UE), where different spatial layers in a scheduled TB are transmitted from two or more TRPs (e.g., base stations). In a second mode, multiple DCI transmissions are possible, where each DCI transmission grants one TB to the device, and each scheduled TB is transmitted from one TRP.

With regard to the second mode, a number of scenarios may occur. For example, multiple DCI transmissions may be transmitted from the same TRP or different TRPs. In another example, multiple TBs associated with the multiple DCI transmissions may correspond to a different payload or a same payload with potentially different redundancy version index (RVID).

In an aspect of the disclosure, TBs may be communicated according to a joint multi-TRP transmission scheme to improve transmission diversity. In the multi-TRP transmission scheme, multiple TRPs may or may not be co-located (e.g., within a same cell). Moreover, the multiple TRPs may transmit data to the same UE. The data sent from the multiple TRPs to the same UE may be the same data or different data. In the case of different data being transmitted from the multiple TRPs, the goal of the scheme may be to achieve higher throughput. In the case of the same data (with potentially different RVID) being transmitted from the multiple TRPs, the goal of the scheme may be to improve transmission reliability.

Aspects of the present disclosure relate to the case where multiple TRPs are used for transmitting the same payload (joint TB transmission) to a UE. By transmitting the same payload across the multiple TRPs, the UE may combine the transmissions, and therefore improve transmission reliability. Joint TB transmission may apply to ultra-reliable low-latency communication (URLLC). Aspects of the present disclosure further detail signaling support for enabling the joint TB transmission across multiple TRPs.

Figure 8:
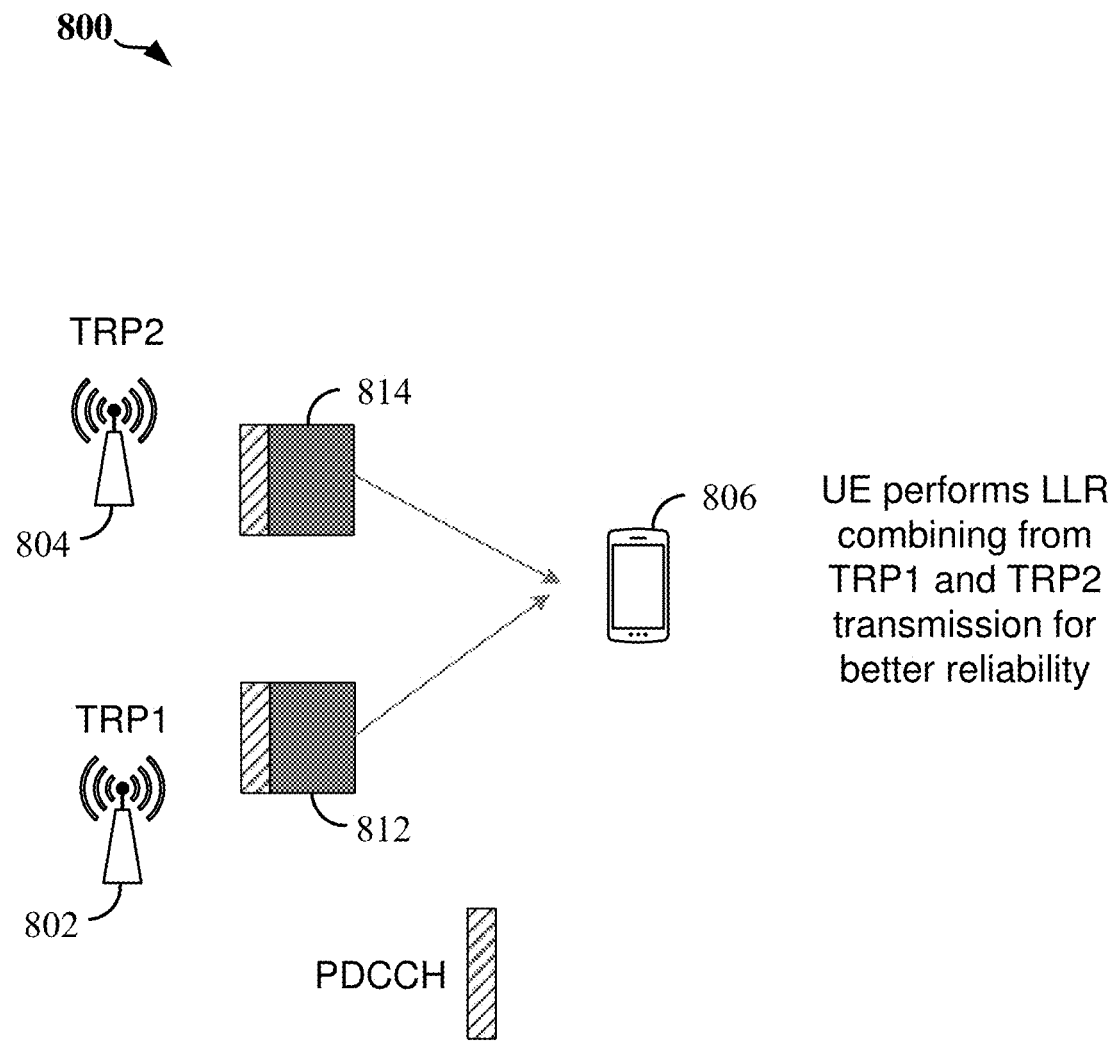
FIG. 8 is a diagram illustrating multi-TRP joint TB transmission.

FIG. 8 is a diagram 800 illustrating multi-TRP joint TB transmission. As shown, a first TRP (e.g., base station) 802 transmits a first TB 812 to a UE 806. Also, a second TRP 804 transmits a second TB 814 to the UE 806. The first TB 812 and the second TB 814 carry the same payload. For better link reliability, the UE 806 may combine log likelihood ratios (LLRs) across multiple TRPs (e.g., first TRP 802 and second TRP 804) to improve a signal-to-interference-plus-noise ratio (SINR) and transmission diversity.

However, in order for the UE 806 to soft combine the LLRs from the different TRPs, a transport block size (TBS) (e.g. payload size) may need to be aligned among the different TRPs. For example, if the first TRP 802 transmits 100 bits of data and the second TRP 804 transmits 200 bits of data, the UE 806 cannot combine the data. The UE 806 may combine the data from the different TRPs if the first TRP 802 and the second TRP 804 transmit the same amount of identical bits (e.g., both the first TRP 802 and the second TRP 804 transmit the same 100 bits of data, or both the first TRP 802 and the second TRP 804 transmit the same 200 bits of data).

In an aspect, TB size calculation may be a function of a modulation and coding scheme (MCS) and a resource block (RB) allocation. Notably, different TRPs (first TRP 802 and second TRP 804) may have different resource block (RB) allocations to the UE 806, and the UE 806 may experience different SINR with respect to the different TRPs. As such, if different TRPs are allowed to transmit to different UEs at the same time, there is no guarantee that the different TRPs will map to the same payload size. Simply following the TBS calculation with the MCS and RB allocation per individual TRP may result in different TB sizes across the different TRPs. Therefore, special consideration may be taken to ensure that the TB size is aligned across multiple TRPs such that LLR combining may be performed across the multiple TRPs.

In a more detailed example, the UE 806 may have one geometry (SINR/link budget) with the first TRP 802 and may have another geometry (SINR/link budget) with the second TRP 804. Moreover, the first TRP 802 may communicate with a lesser number of UEs and may be able to allocate to the UE 806 more resource blocks (RBs) for communication. The second TRP 804 may communicate with a greater number of UEs and may be able to allocate to the UE 806 less resource blocks (RBs) for communication. Accordingly, the MCS and the RB allocation for each individual TRP may not be identical. If a normal TB size calculation is applied, which is a function of MCS and RB allocation, then the TB size across the multiple TRPs will likely be different when the MCS and RB allocation for the multiple TRPs are different. As such, special consideration may be applied to ensure that the TB size is the same across the multiple TRPs so that the UE 806 can perform the combining across the multiple TRPs. Otherwise, if the different TRPs schedule transmissions independently, the UE may not be able to combine the data from the different TRPs. Accordingly, aspects of the present disclosure relate to a novel transmission scheme for ensuring that all TRPs transmit a same payload (TB) size when the TRPs transmit the same data to the UE 806. In an aspect, the UE 806 is informed of when the TRPs intend to transmit data having a certain payload size.

Figure 9:
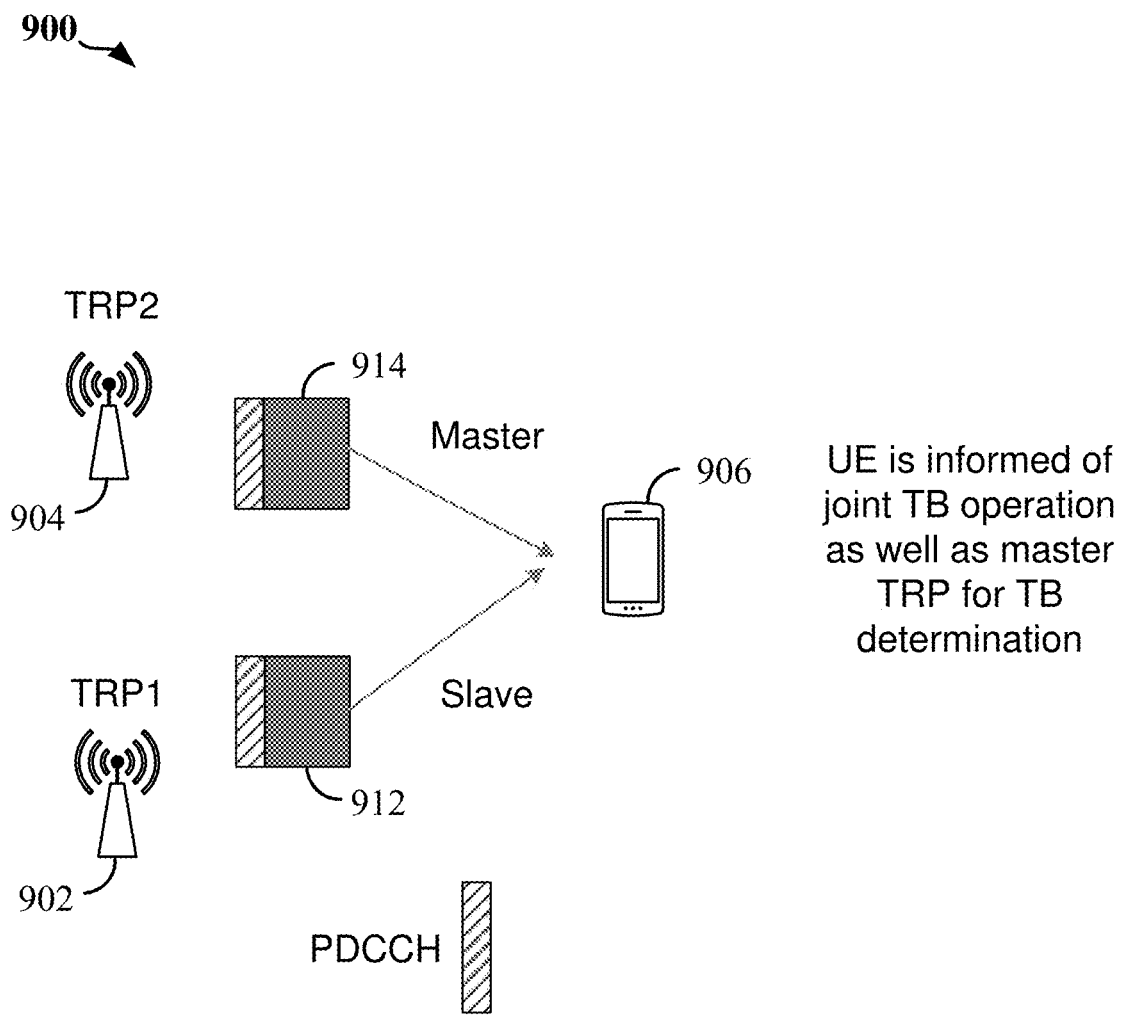
FIG. 9 is a diagram illustrating multi-TRP joint TB transmission according to some aspects of the disclosure.

FIG. 9 is a diagram 900 illustrating multi-TRP joint TB transmission according to aspects of the present disclosure. As shown, a first TRP (e.g., base station) 902 transmits a first TB 912 to a UE 906. Also, a second TRP 904 transmits a second TB 914 to the UE 906. The first TB 912 and the second TB 914 carry the same payload. For better link reliability, the UE 906 may combine log likelihood ratios (LLRs) across multiple TRPs (e.g., first TRP 902 and second TRP 904) to improve a signal to interference and noise ratio (SINR) and transmission diversity.

In an aspect, the UE 906 may be configured to receive a joint TB transmission across multiple TRPs via a radio resource control (RRC) message. The configuration may be applicable for both grant-based transmissions and grant-free transmissions (e.g., semi-persistent scheduling SPS transmissions).

When the UE 906 is configured to receive the joint TB transmission across the multiple TRPs, TBs transmitted from the multiple TRPs according to a same HARQ process at the same time may be combined.

When the UE 906 is not configured to receive the joint TB transmission across the multiple TRPs, the UE 906 does not combine the TBs transmitted from the multiple TRPs even if the TBs are transmitted according to the same HARQ process. Rather, the UE 906 treats each TB as an independent TB for reception.

In an aspect, the RRC message may indicate to the UE 906 an identity of a master TRP and a slave TRP. For example, the RRC message may indicate that the first TRP 902 is a slave TRP and the second TRP 904 is a master TRP.

In case of a grant-based transmission (e.g., physical downlink shared channel (PDSCH) transmission), the UE 906 may determine the TB size for receiving a joint TB transmission based on a downlink control information (DCI) transmission from the master TRP (e.g., second TRP 904). If the UE 906 does not detect the DCI transmission from the master TRP but detects a DCI transmission from the slave TRP (e.g., first TRP 902), the UE 906 may discard the DCI from the slave TRP. In an aspect, the master TRP may use a larger aggregation level for DCI transmission to increase DCI reliability. In case of a SPS transmission, the UE 906 may determine the TB size for receiving a joint TB transmission based on a SPS configuration from the master TRP.

In another aspect, the identity of the master TRP and the slave TRP may be dynamically indicated to the UE 906. For example, a DCI transmission may include an indication signaling the identity of the master TRP or slave TRP to the UE 906. The signaling may be made explicit by adding an indication field in the DCI. Alternatively, the signaling may be conveyed by using different cyclic redundancy check (CRC) masks for the master TRP and the slave TRP. The UE 906 may determine the TB size for receiving the joint TB transmission based on the DCI transmission from the master TRP. If the UE 906 does not detect the DCI transmission from the master TRP but detects a DCI transmission from the slave TRP, the UE 906 may discard the DCI from the slave TRP. The dynamic master/slave indication allows different TRPs to dynamically send a master DCI transmission if a TRP has better link geometry, or more control space to allow for higher aggregation level, with the UE 906. In case of a SPS transmission, the UE 906 may be informed of the identity of the master TRP or the slave TRP via a master/slave indication carried in an activation DCI transmission.

Figure 10:
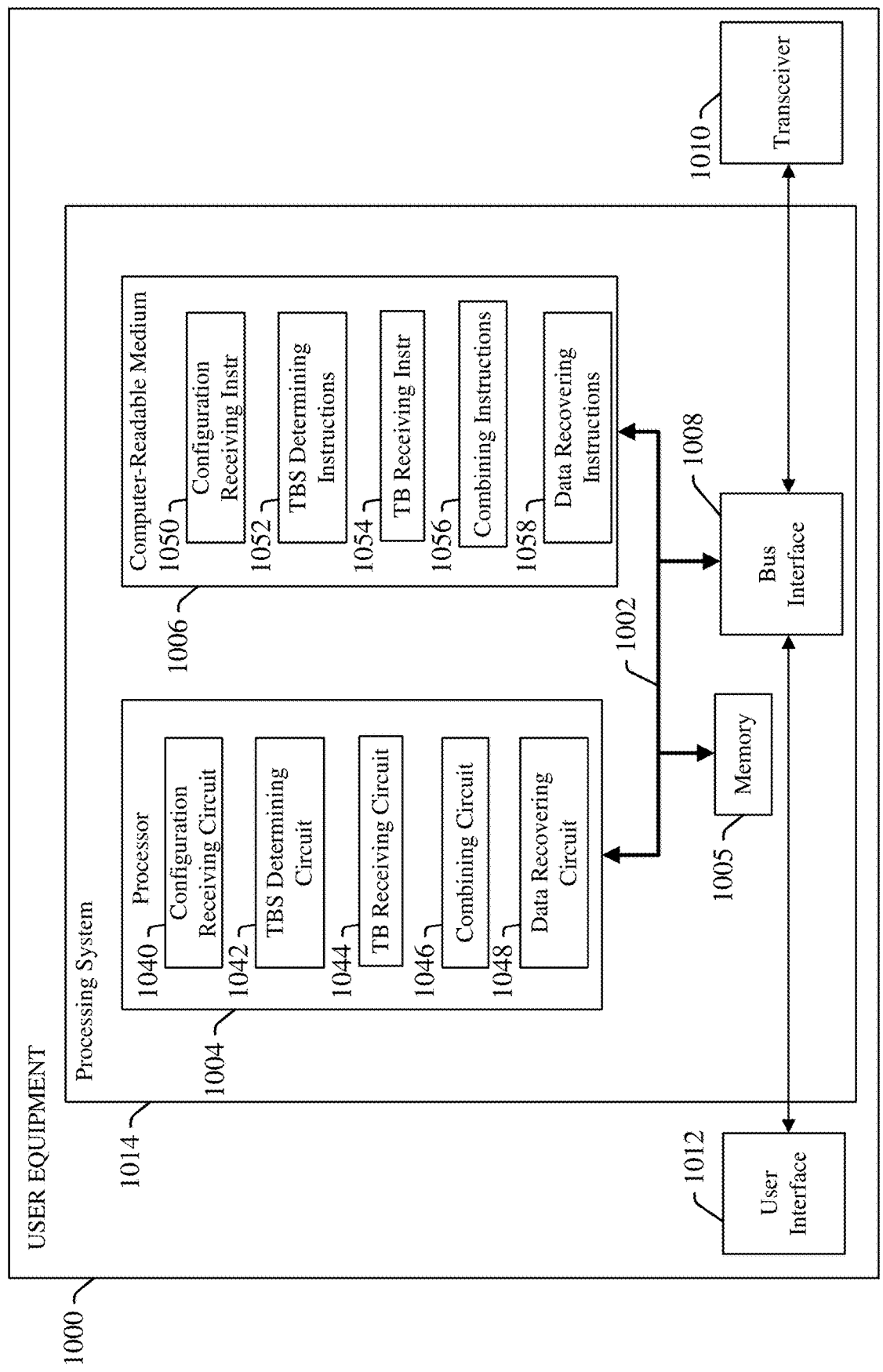
FIG. 10 is a block diagram conceptually illustrating an example of a hardware implementation for a user equipment according to some aspects of the disclosure.

FIG. 10 is a block diagram illustrating an example of a hardware implementation for a user equipment (UE) 1000 employing a processing system 1014. For example, the UE 1000 may be a user equipment (UE) as illustrated in any one or more of FIGS. 1, 2, and/or 3.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described below and illustrated in FIG. 11.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided. Of course, such a user interface 1012 is optional, and may be omitted in some examples, such as a base station.

In some aspects of the disclosure, the processor 1004 may include configuration receiving circuitry 1040 configured for various functions, including, for example, receiving a configuration message configuring the UE to receive a joint transport block (TB) transmission of data. For example, the configuration receiving circuitry 1040 may be configured to implement one or more of the functions described below in relation to FIG. 11, including, e.g., block 1102. The processor 1004 may include TBS determining circuitry 1042 configured for various functions, including, for example, determining a transport block size (TBS) for receiving the joint TB transmission of data from a plurality of transmission points (TRPs). For example, the TBS determining circuitry 1042 may be configured to implement one or more of the functions described below in relation to FIG. 11, including, e.g., block 1104. The processor 1004 may include TB receiving circuitry 1044 configured for various functions, including, for example, receiving transport blocks corresponding to the joint TB transmission, each transport block from a respective one of the plurality of TRPs. For example, the TB receiving circuitry 1044 may be configured to implement one or more of the functions described below in relation to FIG. 11, including, e.g., block 1106. The processor 1004 may include combining circuitry 1046 configured for various functions, including, for example, combining the transport blocks when a size of each of the transport blocks is the determined TBS. For example, the combining circuitry 1046 may be configured to implement one or more of the functions described below in relation to FIG. 11, including, e.g., block 1108. The processor 1004 may include data recovering circuitry 1048 configured for various functions, including, for example, recovering the data based on the combined transport blocks. For example, the data recovering circuitry 1048 may be configured to implement one or more of the functions described below in relation to FIG. 11, including, e.g., block 1110.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable medium 1006 may include configuration receiving instructions 1050 configured for various functions, including, for example, receiving a configuration message configuring the UE to receive a joint transport block (TB) transmission of data. For example, the configuration receiving instructions 1050 may be configured to implement one or more of the functions described below in relation to FIG. 11, including, e.g., block 1102. The computer-readable medium 1006 may include TBS determining instructions 1052 configured for various functions, including, for example, determining a transport block size (TBS) for receiving the joint TB transmission of data from a plurality of transmission points (TRPs). For example, the TBS determining instructions 1052 may be configured to implement one or more of the functions described below in relation to FIG. 11, including, e.g., block 1104. The computer-readable medium 1006 may include TB receiving instructions 1054 configured for various functions, including, for example, receiving transport blocks corresponding to the joint TB transmission, each transport block from a respective one of the plurality of TRPs. For example, the TB receiving instructions 1054 may be configured to implement one or more of the functions described below in relation to FIG. 11, including, e.g., block 1106. The computer-readable medium 1006 may include combining instructions 1056 configured for various functions, including, for example, combining the transport blocks when a size of each of the transport blocks is the determined TBS. For example, the combining instructions 1056 may be configured to implement one or more of the functions described below in relation to FIG. 11, including, e.g., block 1108. The computer-readable medium 1006 may include data recovering instructions 1058 configured for various functions, including, for example, recovering the data based on the combined transport blocks. For example, the data recovering instructions 1058 may be configured to implement one or more of the functions described below in relation to FIG. 11, including, e.g., block 1110.

Figure 11:
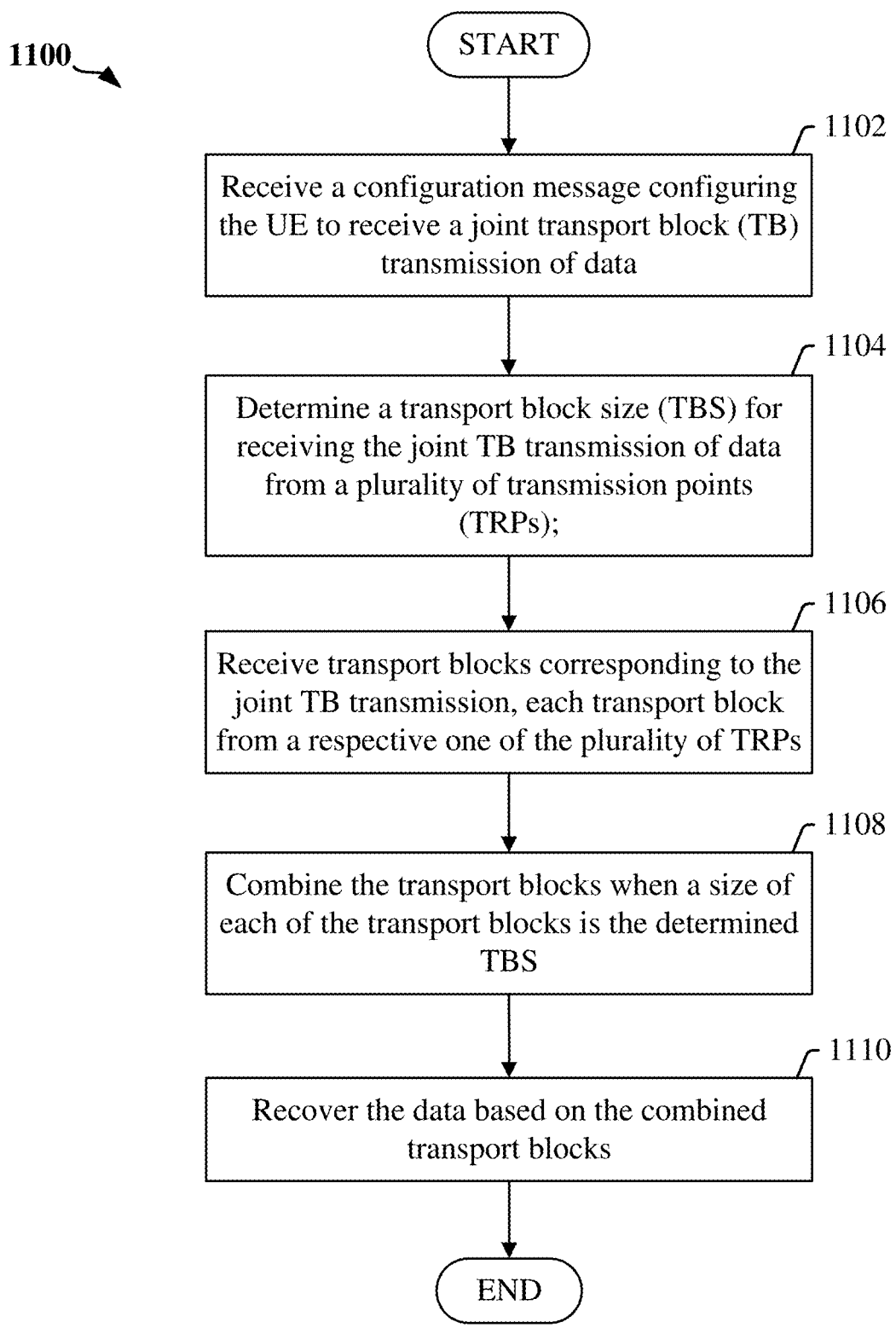
FIG. 11 is a flow chart illustrating an exemplary process for receiving a signal according to some aspects of the disclosure.

FIG. 11 is a flow chart illustrating an exemplary process 1100 for receiving a joint transport block transmission in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, the UE receives a configuration message (e.g., RRC message) configuring the UE to receive a joint transport block (TB) transmission of data.

At block 1104, the UE determines a transport block size (TBS) for receiving the joint TB transmission of data from a plurality of transmission points (TRPs). In an aspect, determining the TBS includes receiving a configuration message configuring one TRP of the plurality of TRPs as a master TRP and one or more other TRPs of the plurality of TRPs as a slave TRP. Accordingly, the UE determines the TBS based on downlink control information (DCI) received from the master TRP if the DCI is received from the master TRP. The UE may further discard DCI received from the slave TRP if the DCI from the master TRP is not received. In another aspect, the UE determines the TBS based on a semi-persistent scheduling (SPS) configuration received from the master TRP.

In a further aspect, determining the TBS includes receiving downlink control information (DCI) from a TRP of the plurality of TRPs and determining whether the TRP is a master TRP or a slave TRP based on an indication included in the DCI and/or a cyclic redundancy check (CRC) mask used for the DCI. Accordingly, the UE determines the TBS based on the DCI if the DCI indicates that the TRP is the master TRP. The UE may also discard the DCI if the DCI indicates that the TRP is the slave TRP. In an aspect, the DCI may be a downlink grant for a grant-based transmission or an activation DCI for a semi-persistent scheduling (SPS) activation.

At block 1106, the UE receives transport blocks corresponding to the joint TB transmission, each transport block from a respective one of the plurality of TRPs. At block 1108, the UE combines the transport blocks when a size of each of the transport blocks is the determined TBS. In an aspect, combining the transport blocks includes combining log likelihood ratios (LLRs) of the respective transport blocks. Thereafter, at block 1110, the UE recovers the data based on the combined transport blocks.

In one configuration, the UE 1000 for receiving a signal includes means for determining a transport block size (TBS)

for receiving a joint transport block (TB) transmission of data from a plurality of transmission points (TRPs), means for receiving transport blocks corresponding to the joint TB transmission, each transport block from a respective one of the plurality of TRPs, means for combining the transport blocks when a size of each of the transport blocks is the determined TBS, means for recovering the data based on the combined transport blocks, and means for receiving a configuration message configuring the UE to receive the joint TB transmission. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one of the FIGS. 1, 2, and/or 3, and utilizing, for example, the processes and/or algorithms described herein in relation to FIG. 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operable at user equipment (UE) for receiving a joint transport block transmission, the method comprising:
   determining a transport block size (TBS) for receiving a joint transport block (TB) transmission of data from a plurality of transmission points (TRPs), wherein the determining the TBS includes:
   receiving downlink control information (DCI) from a TRP of the plurality of TRPs,
   determining whether the TRP is a master TRP or a slave TRP based on at least one of:
   an indication included in the DCI, or
   a cyclic redundancy check (CRC) mask used for the DCI,
   determining the TBS based on the DCI if the DCI indicates that the TRP is the master TRP, and discarding the DCI if the DCI indicates that the TRP is the slave TRP;
receiving transport blocks corresponding to the joint TB transmission, wherein each transport block is from a respective one of the plurality of TRPs and each transport block comprises a same payload;
combining the transport blocks when a size of each of the transport blocks is the same as the determined TBS; and
recovering the data based on the combined transport blocks.

2. The method of claim 1, further comprising receiving a configuration message configuring the UE to receive the joint TB transmission.

3. The method of claim 1, wherein the combining the transport blocks includes combining log likelihood ratios (LLRs) of the respective transport blocks.

4. The method of claim 1, wherein the DCI is one of:
a downlink grant for a grant-based transmission; or
an activation DCI for a semi-persistent scheduling (SPS) activation.

5. A user equipment (UE) for receiving a joint transport block transmission, comprising:
means for determining a transport block size (TBS) for receiving a joint transport block (TB) transmission of data from a plurality of transmission points (TRPs, wherein the means for determining the TB S is configured to:
receive downlink control information (DCI) from a TRP of the plurality of TRPs,
determine whether the TRP is a master TRP or a slave TRP based on at least one of:
an indication included in the DCI, or
a cyclic redundancy check (CRC) mask used for the DCI,
determine the TBS based on the DCI if the DCI indicates that the TRP is the master TRP, and
discard the DCI if the DCI indicates that the TRP is the slave TRP;
means for receiving transport blocks corresponding to the joint TB transmission, wherein each transport block is from a respective one of the plurality of TRPs and each transport block comprises a same payload;
means for combining the transport blocks when a size of each of the transport blocks is the same as the determined TBS; and
means for recovering the data based on the combined transport blocks.

6. The UE of claim 5, further comprising means for receiving a configuration message configuring the UE to receive the joint TB transmission.

7. The UE of claim 5, wherein the means for combining the transport blocks is configured to combine log likelihood ratios (LLRs) of the respective transport blocks.

8. The UE of claim 5, wherein the DCI is one of:
a downlink grant for a grant-based transmission; or
an activation DCI for a semi-persistent scheduling (SPS) activation.

9. A user equipment (UE) for receiving a joint transport block transmission, comprising:
at least one processor;
a transceiver communicatively coupled to the at least one processor; and
a memory communicatively coupled to the at least one processor wherein the at least one processor is configured to:
determine a transport block size (TBS) for receiving a joint transport block (TB) transmission of data from a plurality of transmission points (TRPs, wherein the at least one processor configured to determine the TBS is configured to:
receive downlink control information (DCI) from a TRP of the plurality of TRPs,
determine whether the TRP is a master TRP or a slave TRP based on at least one of:
an indication included in the DCI, or
a cyclic redundancy check (CRC) mask used for the DCI,
determine the TBS based on the DCI if the DCI indicates that the TRP is the master TRP, and
discard the DCI if the DCI indicates that the TRP is the slave TRP,
receive transport blocks corresponding to the joint TB transmission, wherein each transport block is from a respective one of the plurality of TRPs and each transport block comprises a same payload,
combine the transport blocks when a size of each of the transport blocks is the same as the determined TBS, and
recover the data based on the combined transport blocks.

10. The UE of claim 9, the at least one processor further configured to receive a configuration message configuring the UE to receive the joint TB transmission.

11. The UE of claim 9, wherein the at least one processor configured to combine the transport blocks is configured to combine log likelihood ratios (LLRs) of the respective transport blocks.

12. A non-transitory computer-readable medium storing computer-executable code for receiving a joint transport block transmission at user equipment (UE), comprising code for causing a computer to:
determine a transport block size (TBS) for receiving a joint transport block (TB) transmission of data from a plurality of transmission points (TRPs), wherein the code for causing the computer to determine the TBS causes the computer to:
receive downlink control information (DCI) from a TRP of the plurality of TRPs,
determine whether the TRP is a master TRP or a slave TRP based on at least one of:
an indication included in the DCI, or
a cyclic redundancy check (CRC) mask used for the DCI,
determine the TBS based on the DCI if the DCI indicates that the TRP is the master TRP, and
discard the DCI if the DCI indicates that the TRP is the slave TRP;
receive transport blocks corresponding to the joint TB transmission, wherein each transport block is from a respective one of the plurality of TRPs and each transport block comprises a same payload;
combine the transport blocks when a size of each of the transport blocks is the same as the determined TBS; and
recover the data based on the combined transport blocks.

13. The non-transitory computer-readable medium of claim 12, further comprising code for causing the computer to receive a configuration message configuring the UE to receive the joint TB transmission.

14. The non-transitory computer-readable medium of claim 12, wherein the code for causing the computer to combine the transport blocks causes the computer to combine log likelihood ratios (LLRs) of the respective transport blocks.

* * * * *